(12) United States Patent
Yamamoto

(10) Patent No.: US 11,284,042 B2
(45) Date of Patent: Mar. 22, 2022

(54) MOBILE ROBOT, SYSTEM AND METHOD FOR CAPTURING AND TRANSMITTING IMAGE DATA TO REMOTE TERMINAL

(71) Applicant: Toyota Jidosha Kabushiki Kaisha, Toyota (JP)

(72) Inventor: Takashi Yamamoto, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/560,022

(22) Filed: Sep. 4, 2019

(65) Prior Publication Data

US 2020/0084423 A1 Mar. 12, 2020

(30) Foreign Application Priority Data

Sep. 6, 2018 (JP) .............................. JP2018-166556

(51) Int. Cl.
| | |
|---|---|
| H04N 7/18 | (2006.01) |
| H04N 5/232 | (2006.01) |
| H04N 5/445 | (2011.01) |
| H04N 5/93 | (2006.01) |
| B25J 9/16 | (2006.01) |

(52) U.S. Cl.
CPC ............ *H04N 7/185* (2013.01); *B25J 9/1689* (2013.01); *B25J 9/1697* (2013.01); *H04N 5/23203* (2013.01); *H04N 5/23299* (2018.08); *H04N 5/445* (2013.01); *H04N 5/9305* (2013.01)

(58) Field of Classification Search
None
See application file for complete search history.

(56) References Cited

U.S. PATENT DOCUMENTS

| | | | |
|---|---|---|---|
| 10,000,284 B1 | 6/2018 | Purwin et al. | |
| 10,007,890 B1 | 6/2018 | Purwin et al. | |
| 2005/0159841 A1* | 7/2005 | Yasukawa | G05D 1/0094 700/245 |
| 2006/0076917 A1 | 4/2006 | Lim et al. | |
| 2009/0135264 A1* | 5/2009 | John | H04N 1/00925 348/220.1 |
| 2010/0188188 A1 | 7/2010 | Funada et al. | |
| 2012/0215380 A1* | 8/2012 | Fouillade | G05D 1/0038 701/2 |

(Continued)

FOREIGN PATENT DOCUMENTS

| | | |
|---|---|---|
| JP | 2001-315080 A | 11/2001 |
| JP | 2016068161 A | 5/2016 |

(Continued)

*Primary Examiner* — Edemio Navas, Jr.
(74) *Attorney, Agent, or Firm* — Dinsmore & Shohl LLP

(57) ABSTRACT

A mobile robot including an image pickup unit, further includes an accumulation unit configured to accumulate imaging data taken in the past, a reception unit configured to receive designation of a spatial area from a remote terminal, and a processing unit configured, when it is possible to shoot the spatial area received by the reception unit by the image pickup unit, to perform shooting and transmit obtained imaging data to the remote terminal, and when the shooting is impossible, to transmit imaging data including an image of the spatial area accumulated in the accumulation unit to the remote terminal and start a moving process in order to shoot the spatial area by the image pickup unit.

7 Claims, 13 Drawing Sheets

(56) References Cited

U.S. PATENT DOCUMENTS

| | | | |
|---|---|---|---|
| 2012/0277914 A1* | 11/2012 | Crow | G11B 27/034 |
| | | | 700/259 |
| 2014/0303775 A1* | 10/2014 | Oh | G05D 1/0033 |
| | | | 700/253 |
| 2015/0062334 A1* | 3/2015 | Dickinson | G06Q 30/0251 |
| | | | 348/143 |
| 2015/0100461 A1 | 4/2015 | Baryakar et al. | |
| 2017/0171513 A1* | 6/2017 | Nakamura | H04N 7/152 |

FOREIGN PATENT DOCUMENTS

| | | |
|---|---|---|
| WO | 2004/032086 A1 | 4/2004 |
| WO | 2009011380 A1 | 1/2009 |

* cited by examiner

MOBILE ROBOT, SYSTEM AND METHOD FOR CAPTURING AND TRANSMITTING IMAGE DATA TO REMOTE TERMINAL

CROSS REFERENCE TO RELATED APPLICATIONS

This application is based upon and claims the benefit of priority from Japanese patent application No. 2018-166556, filed on Sep. 6, 2018, the disclosure of which is incorporated herein in its entirety by reference.

BACKGROUND

The present disclosure relates to a mobile robot, a remote terminal, a control program for a mobile robot, a control program for a remote terminal, a control system, a control method for a mobile robot, and a control method for a remote terminal.

A technique for performing work by operating a mobile robot located in a remote place is known. Further, a technique for observing a remote place through images sent from a mobile robot that autonomously moves is known (see, for example, International Patent Publication No. WO 2009/011380).

SUMMARY

The present inventors have found the following problem. There are cases where an operator in a remote place wants to check a spatial area that cannot be observed by a mobile robot at that moment (e.g., from the current place) in addition to checking a spatial area that can be observed at that moment. However, it takes some time for the mobile robot to move to the designated spatial area that cannot be observed and hence, during the period in which the mobile robot is moving, a user who remotely operates the mobile robot is just kept waiting.

The present disclosure provides a mobile robot and the like that enables a user to check a situation of a spatial area that the user wants to check without delay.

A first exemplary aspect is a mobile robot including an image pickup unit, further including: an accumulation unit configured to accumulate imaging data taken in the past; a reception unit configured to receive designation of a spatial area from a remote terminal; and a processing unit configured, when it is possible to shoot (i.e., photograph) the spatial area received by the reception unit by the image pickup unit, to perform shooting and transmit obtained imaging data to the remote terminal, and when the shooting is impossible, to transmit imaging data including an image of the spatial area accumulated in the accumulation unit to the remote terminal and start a moving process in order to shoot the spatial area by the image pickup unit.

By configuring the mobile robot, which operates in a remote place, as described above, a user, who remotely operates the mobile robot, can visually recognize an image of the designated spatial area immediately, though the visually-recognized image could be an image in the past. Therefore, the user can recognize a state of the spatial area without delay. Further, when the mobile robot cannot shoot the designated spatial area at that moment, it immediately starts a moving process in order to shoot that spatial area. Therefore, it is possible to reduce a wasteful time that is taken before shooting the actual state.

When imaging data is obtained by shooting the spatial area by the image pickup unit after the moving process is started, the processing unit of the above-described mobile robot may transmit the imaging data to the remote terminal. By sending the latest imaging data as described above, the user can obtain accurate information of the designated spatial area. In this case, the processing unit may transmit imaging data obtained by having the image pickup unit perform shooting during the movement after the moving process is started to the remote terminal together with additional information indicating that the imaging data is obtained during the movement. By having the remote terminal display such an image, the user can recognize not only the intermediate state but also the fact that the latest imaging data has not been sent yet.

Further, when the above-described processing unit transmits imaging data accumulated in the accumulation unit, the processing unit may transmit the imaging data to the remote terminal together with additional information indicating that the imaging data is one accumulated in the accumulation unit. By having such additional information, it is possible to clearly indicate and display that the sent image is an image in the past on the remote terminal side.

Further, the processing unit may perform shooting by using the image pickup unit and transmits obtained imaging data to the remote terminal before the reception unit receives the designation of the spatial area. When the user can first check such an image, he/she can efficiently designate the spatial area.

A second exemplary aspect is a remote terminal configured to receive imaging data from a mobile robot including an image pickup unit and display the received imaging data, including: a transmission unit configured to transmit a designation signal to the mobile robot, the designation signal being generated by designating a spatial area that a user wants to observe; a reception unit configured to receive the imaging data from the mobile robot; a determination unit configured to determine whether or not the imaging data received by the reception unit is one that is obtained by performing shooting by using the image pickup unit after the transmission unit transmits the designation signal; and a display control unit configured to display an image of the imaging data in a display unit in a format in which a result of the determination of the determination unit can be recognized. By configuring the remote terminal as described above, the user can first recognize whether the sent image is an image in the past or the latest image, and then can visually recognize the image of the designated spatial area immediately, though the visually-recognized image could be an image in the past. Therefore, the user can recognize a state of the spatial area without delay.

In the above-described remote terminal, when the display control unit displays, in the display unit, an image of imaging data that is determined, by the determination unit, not to be the one that is obtained by performing shooting by using the image pickup unit after the transmission unit transmits the designation signal, and then the determination unit determines that imaging data newly received by the reception unit is the one that is obtained by performing shooting by using the image pickup unit after the transmission unit transmits the designation signal, the display control unit may display an image of the newly-received imaging data in the display unit. By replacing the displayed image with the latest image as described above, the user can obtain accurate information of the designated spatial area.

Further, when imaging data that is received by the reception unit while the display control unit is displaying, in the display unit, an image of imaging data that is determined, by the determination unit, not to be the one that is obtained by performing shooting by using the image pickup unit after the transmission unit transmits the designation signal contains additional information indicating that the received imaging data is one that is obtained while the mobile robot is moving, the display control unit may display, in the display unit, an image of the imaging data containing the additional information together with the currently-displayed image. By having the remote terminal display such an image, the user can recognize not only the intermediate state before the latest imaging data is obtained, but also the fact that the latest imaging data has not been sent yet.

Further, in the above-described remote terminal, the display control unit may display, as an initial displayed image, an image of imaging data that the reception unit has received from the mobile robot before the transmission unit transmits the designation signal in the display unit, and the transmission unit may transmit, to the mobile robot, the designation signal generated for the spatial area designated by the user by using the image displayed in the display unit as a reference. Since the user can first check such an image, he/she can efficiently designate the spatial area around the mobile robot. Further, by using the designation signal generated as describe above, it is easy to draw up a plan of a route through which the mobile robot also moves.

A third exemplary aspect is a control program for a mobile robot including an image pickup unit, for causing a computer to execute: a receiving step of receiving designation of a spatial area from a remote terminal; a determining step of, when the designation is received in the receiving step, determining whether or not it is possible to shoot the spatial area by using the image pickup unit; a first transmitting step of, when it is determined that the shooting is possible in the determining step, shooting the spatial area and transmitting obtained imaging data to the remote terminal; a second transmitting step of, when it is determined that the shooting is impossible in the determining step, acquiring imaging data including an image of the spatial area from an accumulation unit in which imaging data taken in the past is accumulated; and a process starting step of, when it is determined that the shooting is impossible in the determining step, starting a moving process in order to shoot the spatial area by using the image pickup unit.

In the mobile robot in which such a program is executed by a computer, similarly to the first embodiment, the user can visually recognize an image of the designated spatial area immediately, though the visually-recognized image could be an image in the past. Therefore, the user can recognize a state of the spatial area without delay. Further, when the mobile robot cannot shoot the designated spatial area at that moment, it immediately starts a moving process in order to shoot that spatial area. Therefore, it is possible to reduce a wasteful time that is taken before shooting the actual state.

A fourth exemplary aspect is a control program for a remote terminal configured to receive imaging data from a mobile robot including an image pickup unit and display the received imaging data, for causing a computer to execute: a transmitting step of transmitting a designation signal to the mobile robot, the designation signal being generated by designating a spatial area that a user wants to observe; a receiving step of receiving the imaging data from the mobile robot; a determining step of determining whether or not the imaging data received in the receiving step is one that is obtained by performing shooting by using the image pickup unit after the designation signal is transmitted in the transmitting step; and a display control step of displaying an image of the imaging data in a display unit in a format in which a result of the determination in the determining step can be recognized. In the remote terminal in which such a program is executed by a computer, similarly to the second embodiment, the user can first recognize whether the sent image is an image in the past or the latest image, and then can visually recognize an image of the designated spatial area immediately, though the visually-recognized image could be an image in the past. Therefore, the user can recognize a state of the spatial area without delay.

According to the present disclosure, a user can check a situation of a spatial area designated in a surrounding space of a mobile robot that operates in a remote place.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Figure 1:
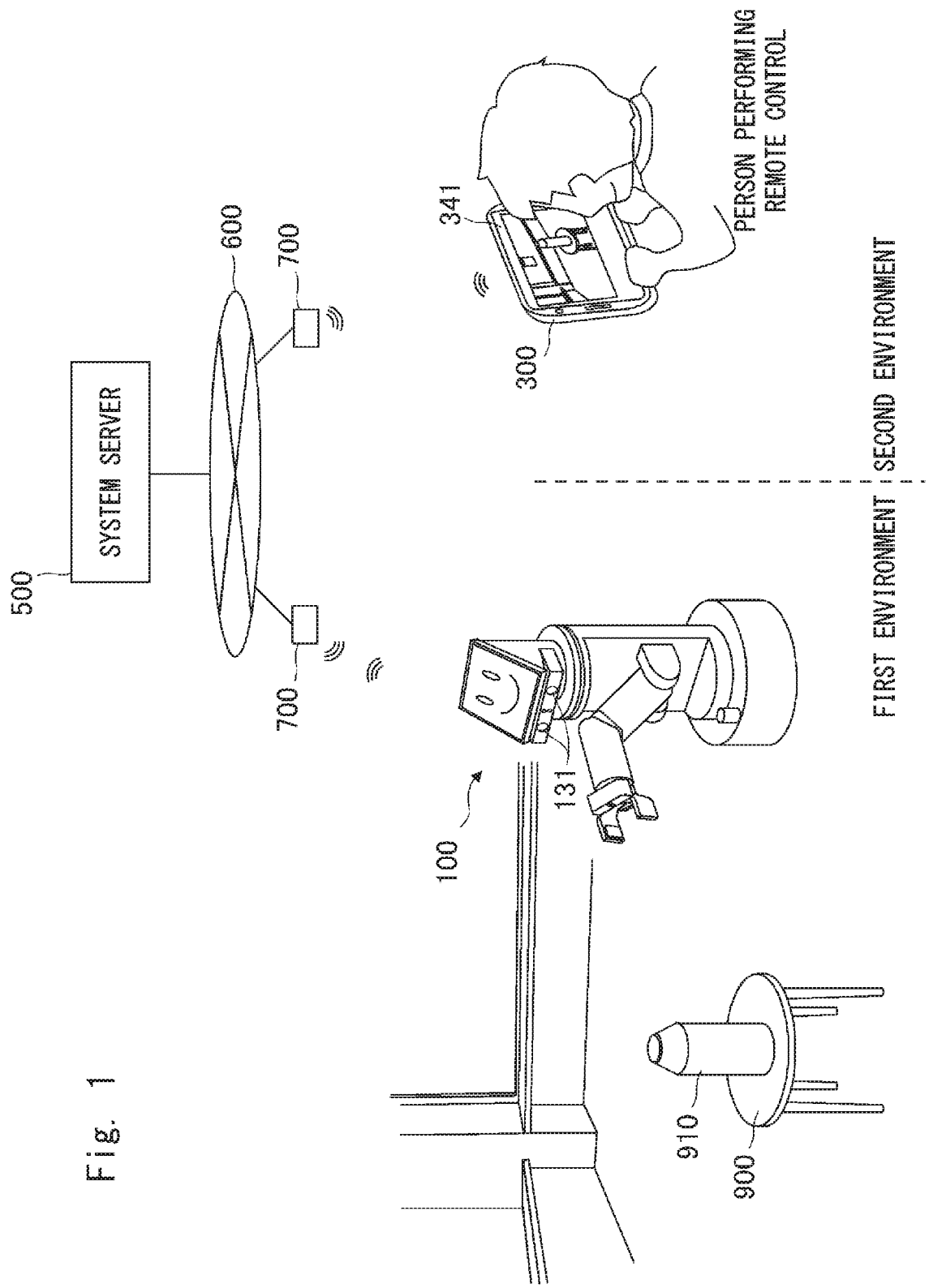
FIG. 1 is a conceptual diagram for explaining an overall environment where a mobile robot according to an embodiment is used.

FIG. 1 is a schematic diagram for explaining an overall environment where a mobile robot 100 according to an embodiment is used. The mobile robot 100 that performs various operations in a first environment is remotely operated through a system server 500 connected to the Internet 600 by a user present in a second environment away from the first environment. In particular, the mobile robot 100 is remotely operated as the user operates a remote terminal 300.

The mobile robot 100 is connected to the Internet 600 through a wireless router 700 in the first environment. Further, the remote terminal 300 is connected to the Internet 600 through a wireless router 700 in the second environment. The system server 500 is connected to the Internet 600. The mobile robot 100 receives various operation signals from the remote terminal 300 and performs a moving operation or a shooting operation (i.e., a photographing operation). The example shown in FIG. 1 shows a state in which the mobile robot 100 is preparing for a task of grasping and conveying a container 910, which is a bottle placed on a table 900 in this example.

The mobile robot 100 is able to shoot (e.g., photograph) the container 910 and its surrounding spatial area by using a stereo camera 131, and thereby to generate their imaging data. In the case where the mobile robot 100 autonomously operates, it performs spatial recognition by processing the imaging data and thereby recognizes a position and a size of the container 910, which is the target object. Further, when the user requests imaging data, the mobile robot 100 transmits generated imaging data to the remote terminal 300. Note that when the remote terminal 300 cannot perform 3D displaying, the mobile robot 100 may convert the generated imaging data into imaging data in a format in conformity with 2D displaying and transmit the converted imaging data to the remote terminal 300.

Note that in this embodiment, the Internet 600 is used as a network to which the mobile robot 100, the remote terminal 300, etc. are connected. However, the network may be other types of networks such as an intranet. Alternatively, the mobile robot 100 and the remote terminal 300 may be connected directly with each other through near-field communication such as Bluetooth (Registered Trademark) without using any network interposed therebetween.

The remote terminal 300 is, for example, a tablet terminal and includes a display panel 341. An image of the imaging data received from the mobile robot 100 is displayed on the display panel 341 and the user can visually recognize a state of the designated spatial area in an indirect manner. Further, the user can generate various operation signals for operating the mobile robot 100 by operating the remote terminal 300. The generated operation signals are transmitted to the mobile robot 100 through the Internet 600.

Figure 2:
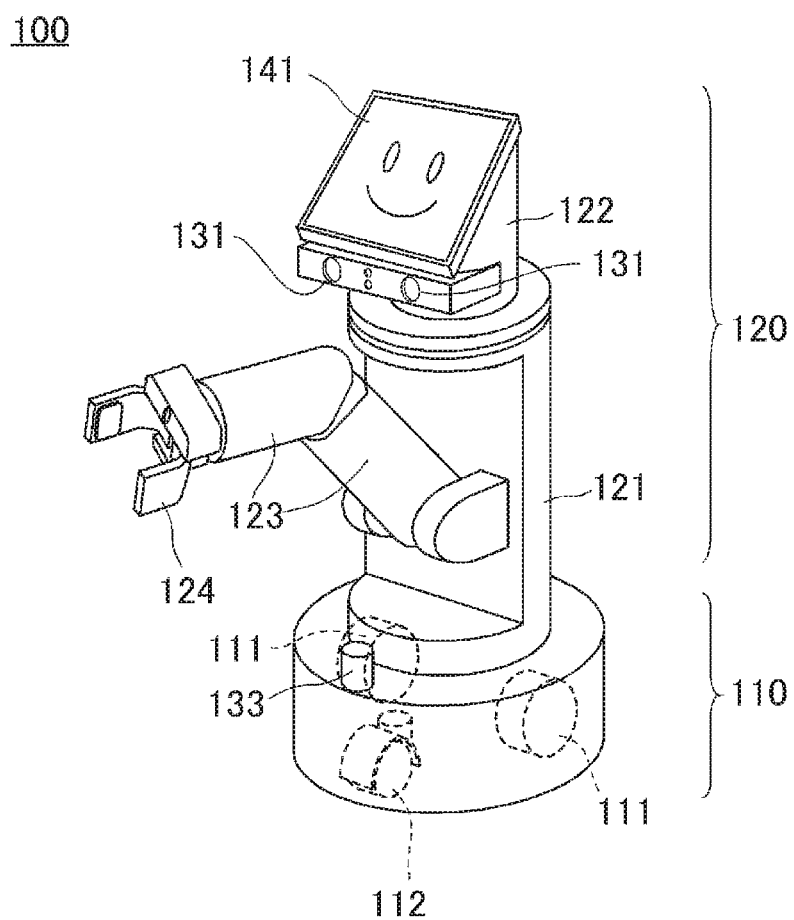
FIG. 2 is a perspective view showing an external appearance of the mobile robot.

FIG. 2 is a perspective view showing an external appearance of the mobile robot 100. The mobile robot 100 includes, mainly, a movable base part 110 and a main-body part 120. The movable base part 110 supports two driving wheels 111 and a caster 112, each of which is in contact with a traveling surface, inside its cylindrical housing. The two driving wheels 111 are arranged so that the centers of their rotation axes coincide with each other. Each of the driving wheels 111 is rotationally driven by a motor (not shown) independently of each other. The caster 112 is a driven wheel and is disposed so that its pivotal axis extending from the movable base part 110 in the vertical direction axially supports the wheel at a place away from its rotation axis. Further, the caster 112 follows the movement of the movable base part 110 so as to move in the moving direction of the movable base part 110.

The movable base part 110 includes a laser scanner 133 in a peripheral part of its top surface. The laser scanner 133 scans a certain range on the horizontal plane at intervals of a certain stepping angle and outputs information as to whether or not there is an obstacle in each direction. Further, when there is an obstacle, the laser scanner 133 outputs a distance to the obstacle.

The main-body part 120 includes, mainly, a body part 121 mounted on the top surface of the movable base part 110, a head part 122 placed on the top surface of the body part 121, an arm 123 supported on the side surface of the body part 121, and a hand 124 disposed at the tip of the arm 123. The arm 123 and the hand 124 are driven by motors (not shown) and grasp various objects in a controlled posture. The body part 121 is able to rotate around a vertical axis with respect to the movable base part 110 by a driving force of a motor (not shown).

The head part 122 mainly includes a stereo camera 131 and a display panel 141. The stereo camera 131 has a configuration in which two camera units having the same angle of view are arranged away from each other, and outputs imaging signals of images taken by the respective camera units.

The display panel 141 is, for example, a liquid crystal display panel, and displays an animated face of a pre-defined character and displays information about the mobile robot 100 in the form of text or by using icons. By displaying the face of the character on the display panel 141, it is possible to impart an impression that the display panel 141 is a pseudo face part to people around the mobile robot 100.

The head part 122 is able to rotate around a vertical axis with respect to the body part 121 by a driving force of a motor (not shown). Therefore, the stereo camera 131 can shoot an object located in an arbitrary direction. Further, the display panel 141 can show displayed contents in an arbitrary direction.

Figure 3:
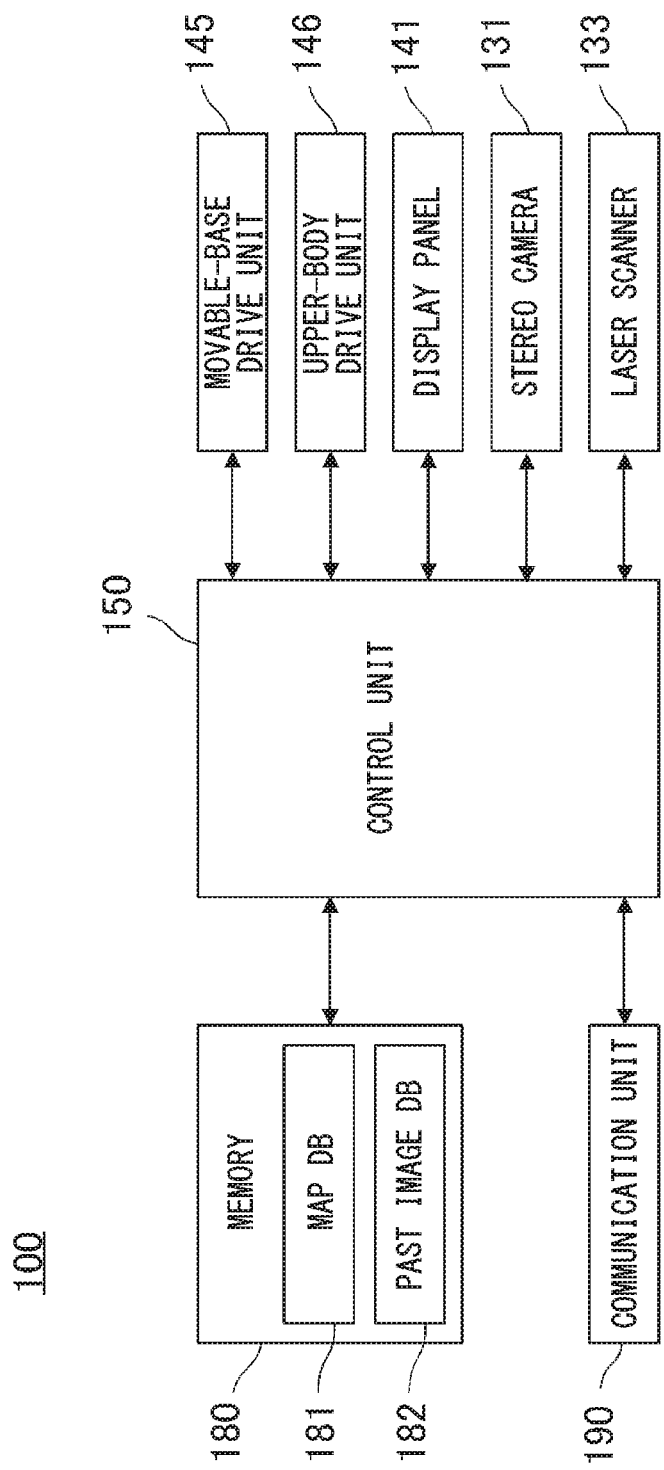
FIG. 3 is a control block diagram of the mobile robot.

FIG. 3 is a control block diagram of the mobile robot 100. Main elements related to a process for transmitting imaging data to the remote terminal 300 is described hereinafter. However, the mobile robot 100 includes other elements in its configuration and may include other additional elements that contribute to the process for transmitting imaging data.

A control unit 150 is, for example, a CPU (Central Processing Unit) and is included in, for example, a control box disposed in the body part 121. A movable-base drive unit 145 includes driving wheels 111, and a driving circuit and motors for driving the driving wheels 111. The control unit 150 performs rotation control of the driving wheels by sending a driving signal to the movable-base drive unit 145. Further, the control unit 150 receives a feedback signal such as an encoder signal from the movable-base drive unit 145 and recognizes a moving direction and a moving speed of the movable base part 110.

An upper-body drive unit 146 includes a grasping part including an arm 123 and a hand 124, a body part 121, a head part 122, and driving circuits and motors for driving these components. The control unit 150 performs a grasping motion and a gesture by transmitting a driving signal to the upper-body drive unit 146. Further, the control unit 150 receives a feedback signal such as an encoder signal from the upper-body drive unit 146, and recognizes positions and moving speeds of the arm 123 and the hand 124, and orientations and rotation speeds of the body part 121 and the head part 122.

The display panel 141 receives an image signal generated by the control unit 150 and displays an image thereof. Further, as described above, the control unit 150 generates an image signal of the character or the like and displays an image thereof on the display panel 141. In the case where the display panel 141 includes a touch panel, the display panel 141 transmits a touch signal to the control unit 150.

The stereo camera 131 shoots a surrounding environment according to a request from the control unit 150 and delivers an obtained imaging signal to the control unit 150. The control unit 150 performs image processing by using the imaging signal and converts the imaging signal into imaging data in a predetermined format in order to transmit it to the remote terminal 300. The laser scanner 133 detects whether or not there is an obstacle in the moving direction according to a request from the control unit 150 and delivers a detection signal, which is a result of the detection, to the control unit 150.

A memory 180 is a nonvolatile storage medium. For example, a solid-state drive is used for the memory 180. The memory 180 stores, in addition to a control program for controlling the mobile robot 100, various parameter values, functions, lookup tables, etc. used for the control and the calculation. In particular, the memory 180 includes a storage area for a map DB 181, which is a database of map information in which spaces where the robot is supposed to autonomously move are described, and a past image DB 182, which is a database of imaging data that is collected by shooting a surrounding space during operations in the past. The map DB 181 is in charge of a function as a map accumulation unit for accumulating map information, and the past image DB 182 is in charge of a function as an imaging data accumulation unit for accumulating imaging data in the past.

In the map DB 181, target map information which has been acquired from, for example, the system server 500 according to the range in which the mobile robot 100 moves is accumulated. The past image DB 182 may include existing imaging data that was taken in advance by other mobile robots and the like in addition to the imaging data that was collected by the mobile robot 100 through the stereo camera 131 during operations in the past as described above. Imaging data accumulated in the past image DB 182 includes, in its header area or the like, area information indicating which spatial area was shot to obtain the imaging data and additional information indicating that the imaging data was taken and accumulated in the past.

A communication unit 190 is, for example, a wireless LAN unit and performs radio communication with the wireless router 700. The communication unit 190 receives a designation signal and an operation instruction sent from the remote terminal 300 and delivers them to the control unit 150. The designation signal is a signal for requesting imaging data, which is generated by a user by designating a spatial area that he/she wants to observe in the remote terminal 300. By performing such a receiving process, the communication unit 190 cooperates with the control unit 150 and functions as a receiving unit that receives a designation signal. Further, the communication unit 190 transmits imaging data acquired by the stereo camera 131 and imaging data accumulated in the past image DB 182 to the remote terminal 300 under the control of the control unit 150. Further, the map information accumulated in the map DB 181 and current position information of the mobile robot 100 are also transmitted to the remote terminal 300.

The control unit 150 performs control of the whole mobile robot 100 and various calculation processes by executing a control program read from the memory 180. When it is possible to perform shooting the spatial area designated by the user by using the stereo camera 131, the control unit 150 performs the shooting and transmits obtained imaging data to the remote terminal 300, details of which will be described later. On the other hand, when it is impossible to perform shooting, the control unit 150 extracts imaging data including an image of the designated spatial area from the imaging data accumulated in the past image DB 182 and transmits the extracted imaging data to the remote terminal 300. Further, the control unit 150 starts a moving process in order to shoot the spatial area by the stereo camera 131. The control unit 150 functions as a processing unit that performs the above-described series of processes.

Figure 4:
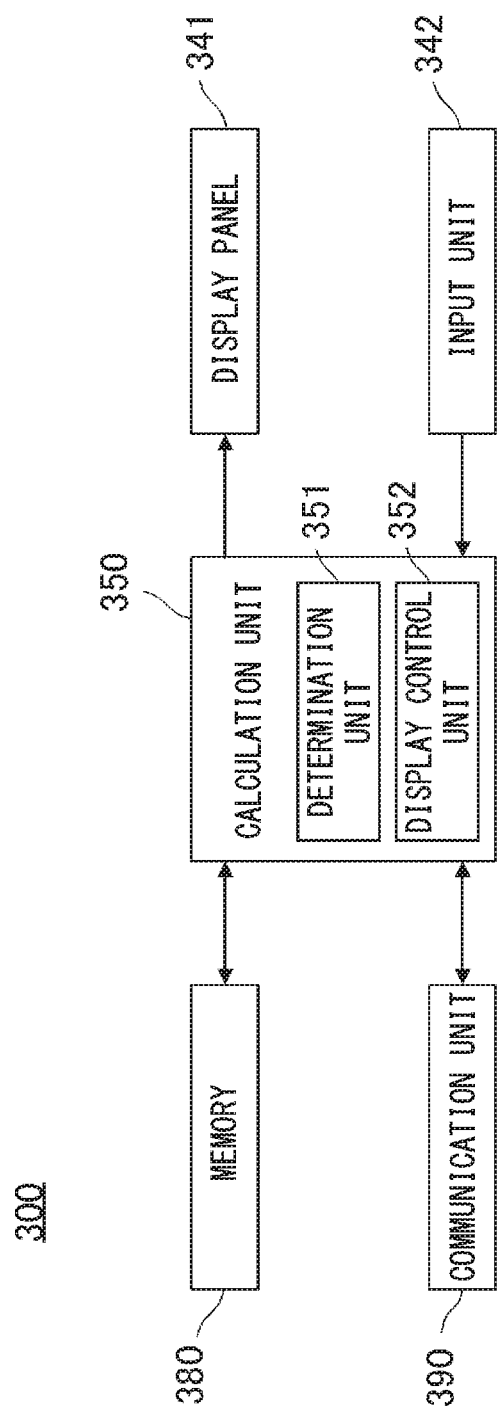
FIG. 4 is a control block diagram of a remote terminal.

FIG. 4 is a control block diagram of the remote terminal 300. Main elements related to a process for receiving imaging data from the mobile robot 100 is described hereinafter. However, the remote terminal 300 includes other elements in its configuration and may include other additional elements that contribute to the process for receiving imaging data.

A calculation unit 350 is, for example, a CPU and performs control of the whole remote terminal 300 and various calculation processes by executing a control program read from the memory 380. The display panel 341 is, for example, a liquid crystal display panel and functions as a display unit that receives an image signal generated by the calculation unit 350 and displays an image thereof. The image signal generated by the calculation unit 350 may be, for example, a signal obtained by unfolding imaging data sent from the mobile robot 100 or a signal obtained by unfolding map information.

An input unit 342 includes a touch panel disposed so as to be superimposed on the display panel 141 or press buttons disposed in a peripheral part of the display panel 141. The input unit 342 generates an operation signal in response to an operation performed by the user and delivers the generated operation signal to the calculation unit 350. A memory 380 is a nonvolatile storage medium. For example, a solid-state drive is used for the memory 380. The memory 380 stores, in addition to a control program for controlling the remote terminal 300, various parameter values, functions, lookup tables, etc. used for the control and the calculation.

A communication unit 390 is, for example, a wireless LAN unit and performs radio communication with the wireless router 700. A communication unit 390 cooperates with the calculation unit 350, and is in charge of a function as a transmitting unit for transmitting a designation signal, an operation signal, etc. to the mobile robot 100 and a function of a receiving unit for receiving imaging signal and the like from the mobile robot 100.

The calculation unit 350 is also in charge of a function as a functional calculation unit that performs various processes and calculations. A determination unit 351 determines whether or not imaging data sent from the mobile robot 100 is one that was acquired by shooting performed by the mobile robot 100 after the remote terminal 300 transmitted the designation signal. A display control unit 352 generates an image signal of an image to be displayed on the display panel 141 and controls displaying thereof. In particular, the display control unit 352 displays, on the display panel 141, an image of imaging data in a format in which a determination result of the determination unit 351 can be recognized. Details will be described later.

Figure 5:
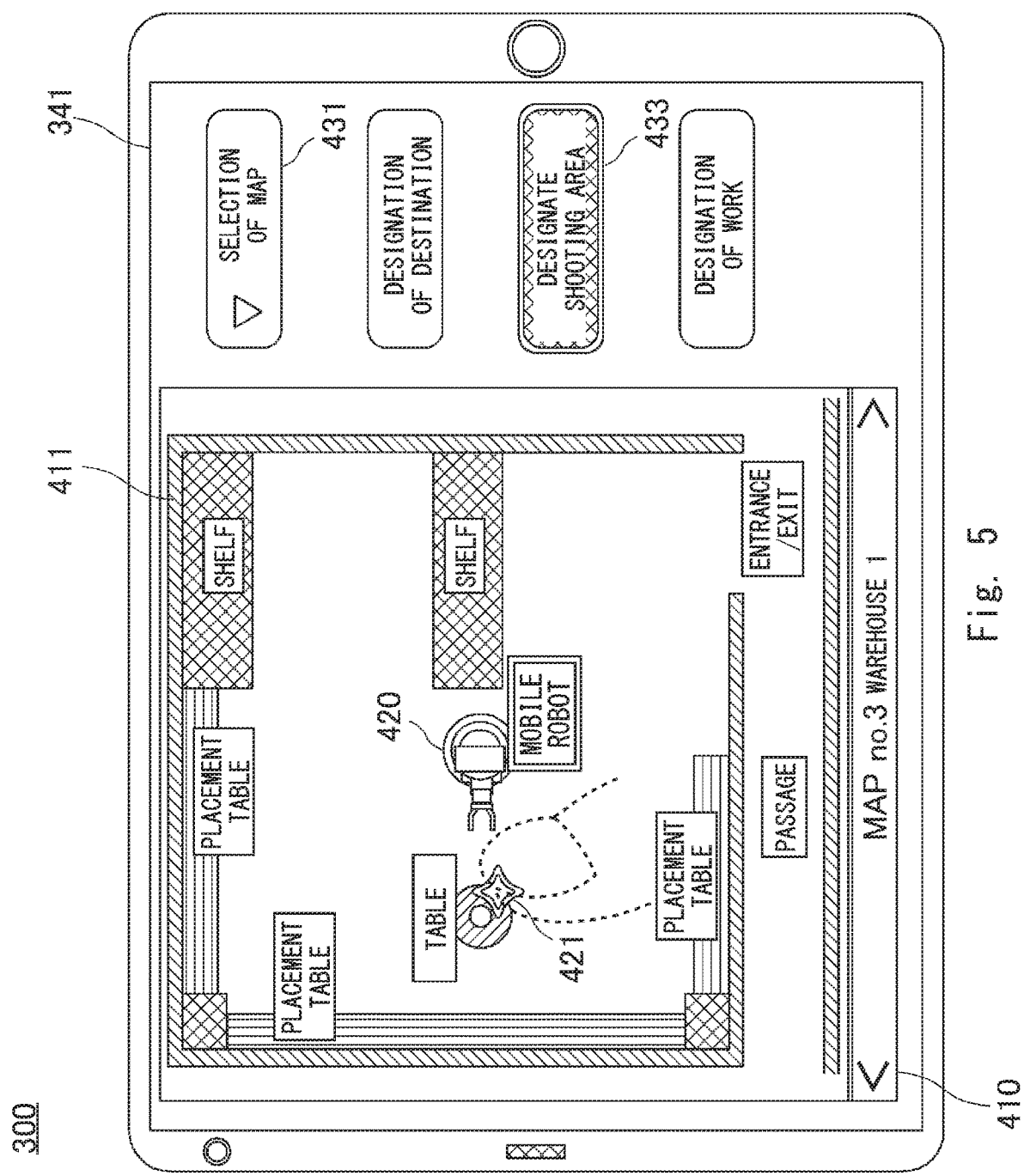
FIG. 5 shows how a spatial area that a user wants to check is designated in a remote terminal.

Next, a series of processes from when a user designates a spatial area of which the user wants to check a situation by operating the remote terminal 300 to when imaging data is sent from the mobile robot 100 and an image thereof is displayed on the remote terminal 300 is described. FIG. 5 shows how a spatial area that the user wants to check is designated in the remote terminal 300.

A map window 410 including a map 411 of a space where the mobile robot 100 is currently located is displayed on the display panel 141 of the remote terminal 300 together with a title indicating where the map is representing. The map 411 is expressed by using shapes of structures included in the target space and is displayed together with their names. The names may be, for example, a "shelf", a "placement table", a "table", a "passage", and an "entrance/exit", and are displayed near the shapes of the respective structures represented by them. Regarding such map information pieces, they are acquired from the map DB 181 of the mobile robot 100, or those stored in the memory 380 in advance are used.

In the map 411, an icon 420 representing the mobile robot 100 itself (hereinafter referred to as an own icon 420) is superimposed at a place corresponding to the current position of the mobile robot 100 in a first environment. The own icon 420 indicates, by its orientation, which direction the mobile robot 100 is facing. From these displayed items, the user can roughly presume a state of the first environment and a current situation of the mobile robot 100.

The user touches a spatial area on the map 411 of which he/she wants to check a situation with his/her fingertip. The example shown in FIG. 5 shows a state in which a peripheral part of the table is touched and a pointer 421 appears in response to this touching. When this touched spatial area is appropriate, the user fixes the designation thereof by touching an imaging area designation button 433 displayed adjacent to the map window 410. When the designation is fixed, the calculation unit 350 generates a designation signal in which the designated spatial area is described and transmits the generated designation signal to the mobile robot 100 through the communication unit 190.

Note that the user can correct the designated spatial area by touching the map 411 again unless the imaging area designation button 433 has been touched. Further, when the user wants to display a map of a spatial area other than the spatial area where the mobile robot 100 is currently located, he/she can select the other map by touching a map selection button 431.

In the example shown in FIG. 5, the spatial area designated by the user is a spatial area that can be immediately shot from the current position of the mobile robot 100. In this case, upon receiving the designation signal, the mobile robot 100 shoots the spatial area by the stereo camera 131 and transmits generated imaging data to the remote terminal 300. Note that there are cases where the mobile robot 100 adjusts the shooting direction by swinging the head part 122 with the stereo camera 131 mounted thereon before performing the shooting.

Figure 6:
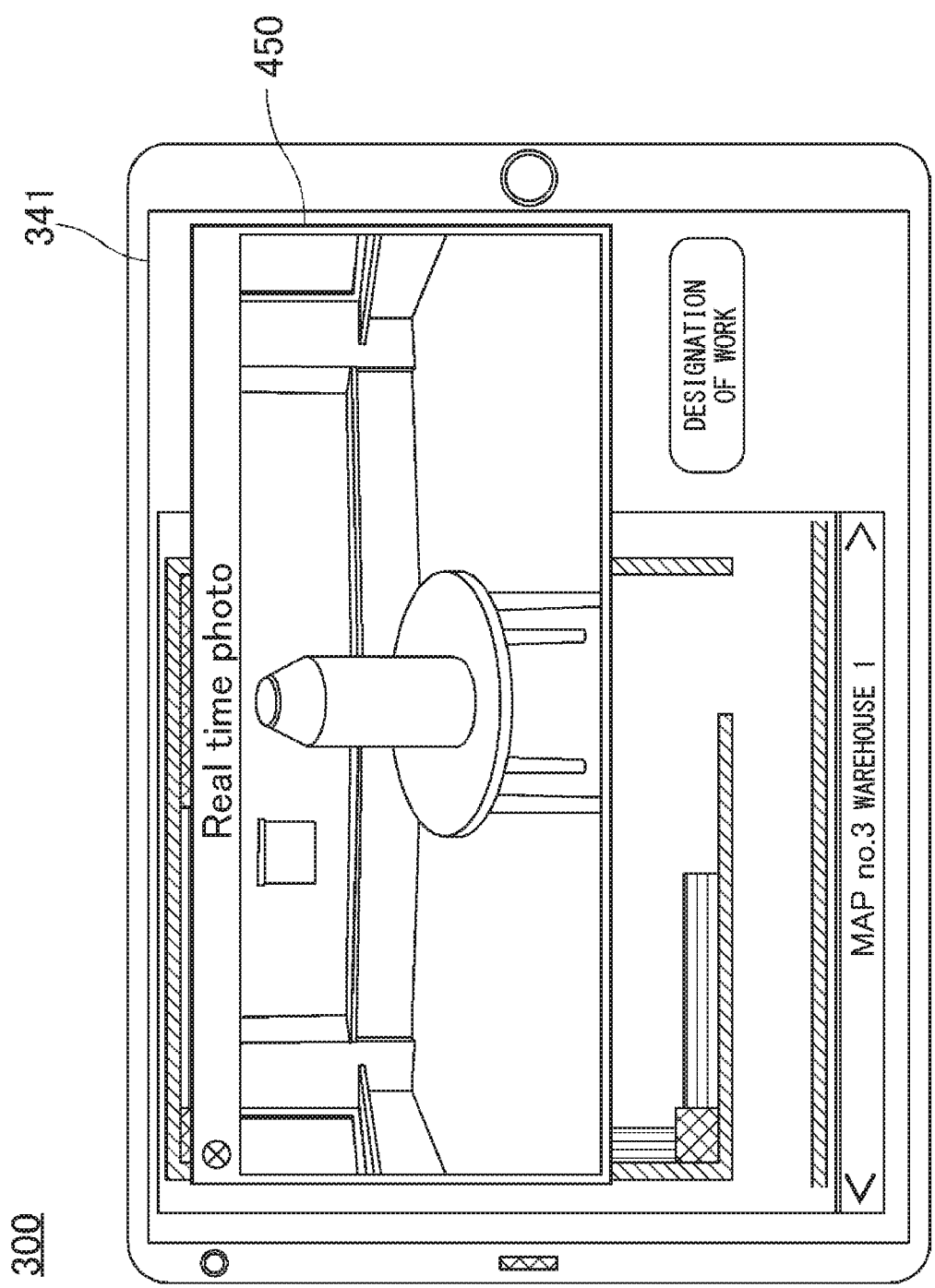
FIG. 6 shows a response screen that is displayed when shooting is possible.

FIG. 6 shows a response screen that is displayed when shooting is possible. Upon receiving the imaging data from the mobile robot 100, the determination unit 351 determines whether or not the imaging data is one that was acquired by shooting performed after the remote terminal 300 transmitted the designation signal. In particular, for example, the determination unit 351 makes a decision by checking the header information of the imaging data and thereby checking, for example, whether there is a description indicating that the imaging data was taken according to the transmitted designation signal.

When the determination unit 351 determines that the imaging data is one that was acquired by shooting performed after the remote terminal 300 transmitted the designation signal, the display control unit 352 displays an image of that imaging data on the display panel 141 in a format in which its determination result of can be recognized. In particular, as shown in FIG. 6, an image window 450 is newly opened and a title such as "Real time photo" indicating that the displayed image shows the current state is displayed together with the unfolded image.

Figure 7:
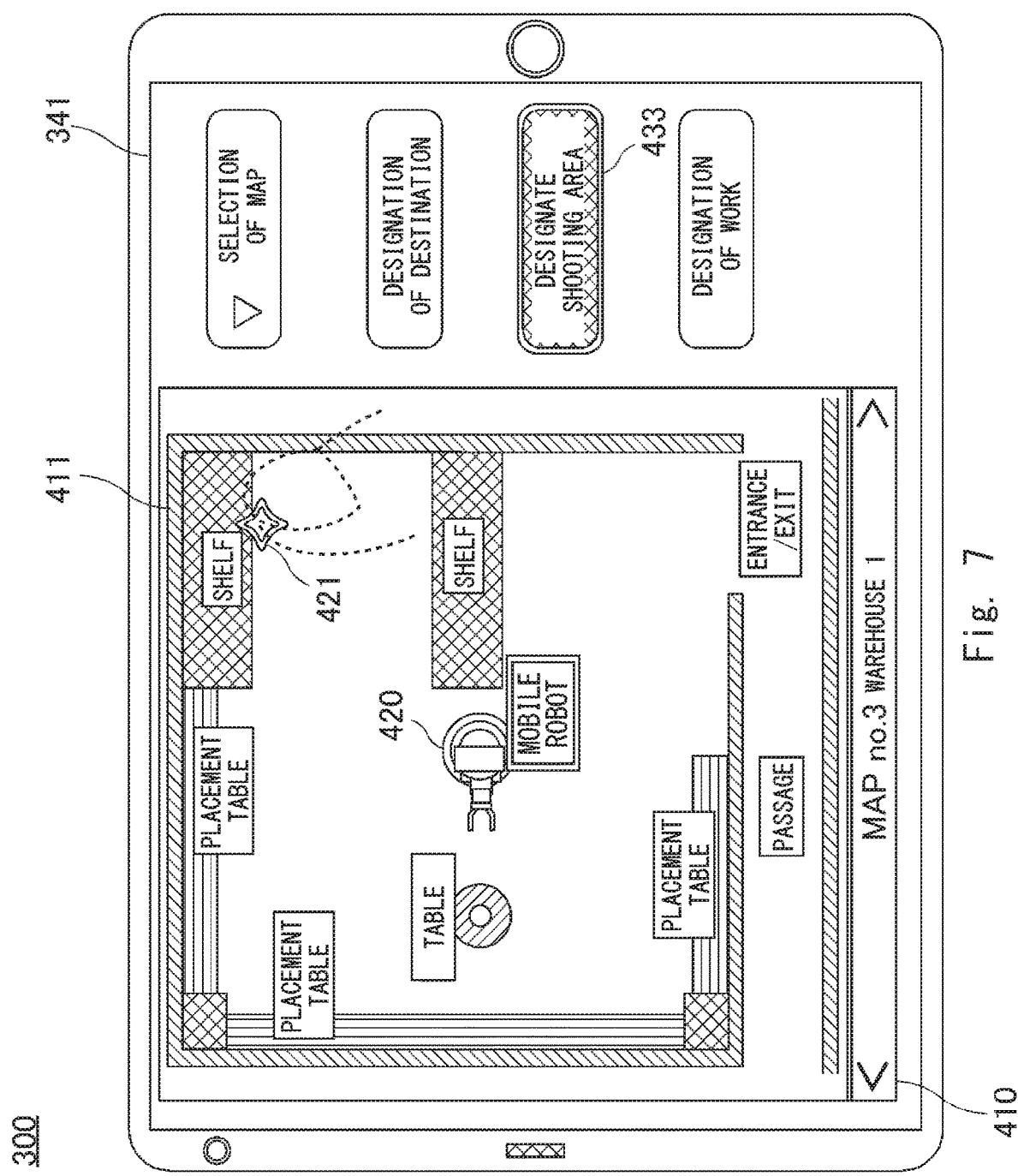
FIG. 7 shows how a spatial area that a user wants to check is designated in a remote terminal.

Similarly to FIG. 5, FIG. 7 shows how the spatial area that the user wants to check is designated in the remote terminal 300. However, in contrast to FIG. 5, FIG. 7 shows a case where a spatial area that is away from the own icon 420 is designated.

In particular, in the map 411, a shelf that is located obliquely behind the mobile robot 100 indicated by the own icon 420 (when the direction the mobile robot 100 is facing is defined as the forward direction) is touched and a pointer 421 appears in response to this touching. When the imaging area designation button 433 is touched and hence the designation is fixed, the calculation unit 350 generates a designation signal in which the designated spatial area is described and transmits the generated designation signal to the mobile robot 100 through the communication unit 190.

The spatial area designated by the user in the example shown in FIG. 7 is a spatial area that cannot be immediately shot from the current position of the mobile robot 100. In this case, upon receiving the designation signal, the mobile robot 100 first extracts imaging data including an image of the designated spatial area from the imaging data accumulated in the past image DB 182 and transmits the extracted imaging data to the remote terminal 300. Further, the mobile robot 100 starts a moving process in order to shoot the spatial area by the stereo camera 131.

Figure 8:
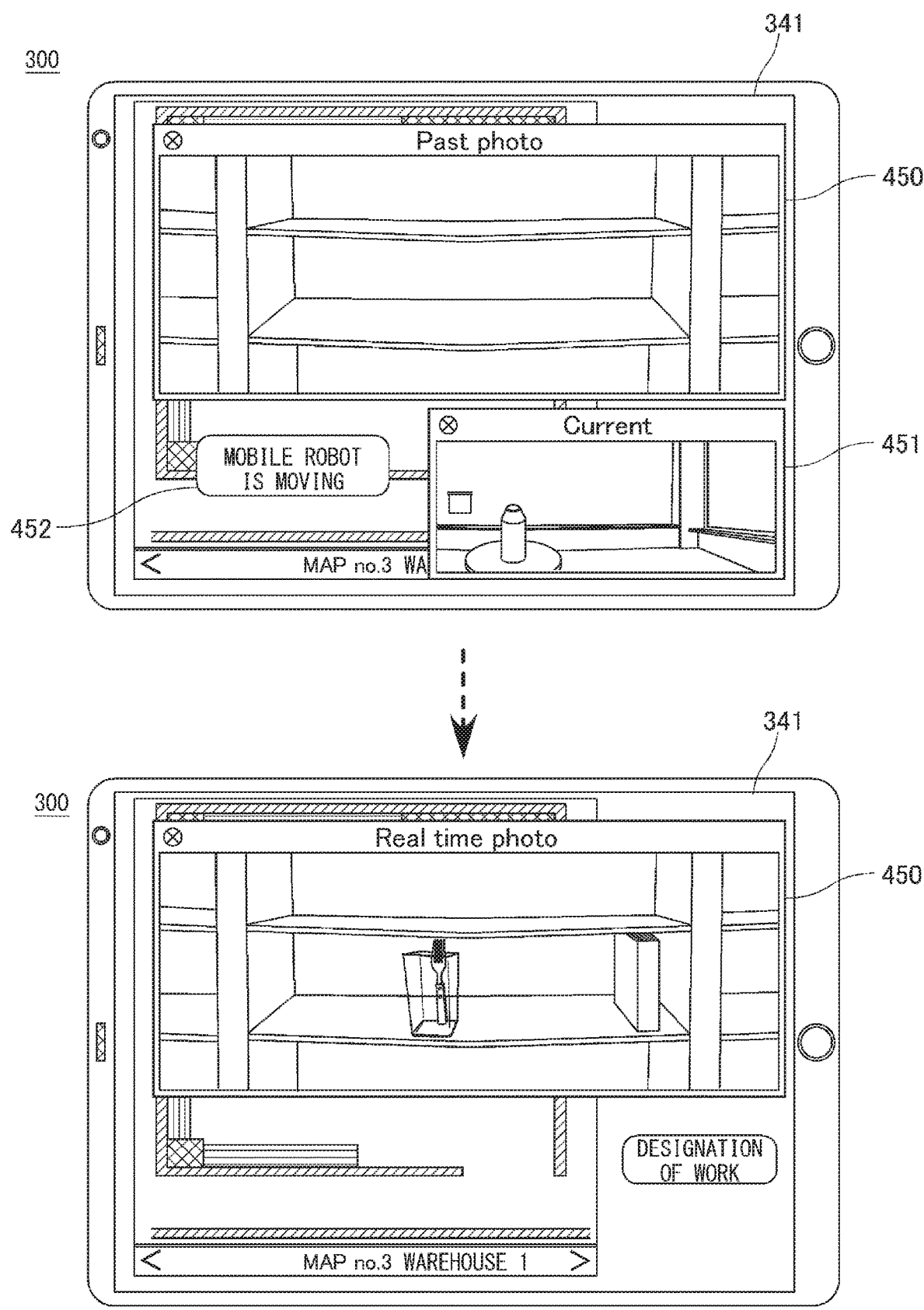
FIG. 8 shows a response screen that is displayed when shooting is impossible.

FIG. 8 shows a change in a response screen that occurs when shooting is impossible. In FIG. 8, an upper part shows a response screen of the remote terminal 300 when the mobile robot 100 has started the moving process and is successively transmitting imaging data that are taken during the movement.

As described above, upon receiving the imaging data from the mobile robot 100, the determination unit 351 determines whether or not the imaging data is one that was acquired by shooting performed after the remote terminal 300 transmitted the designation signal. For example, when the imaging data contains additional information indicating that the imaging data is one accumulated in the past image DB 182, the determination unit 351 determines that the imaging data is one that was already present before the transmission of the designation signal. The display control unit 352 displays an image of the imaging data on the display panel 141 in a format in which this determination result of the determination unit 351 can be recognized. Specifically, as shown in FIG. 7, an image window 450 is newly opened and a title such as "Past photo" indicating that the displayed image shows a state in the past is displayed together with the unfolded image. As described above, by displaying an image in the past, the user can first recognize the displayed image is an image in the past, and then can recognize at least what kind of place the designated spatial area is without delay, though he/she cannot immediately check the current situation of the designated spatial area.

When the display control unit 352 displays the image in the past, it acquires imaging data taken by the mobile robot 100 while it is moving to the designated spatial area and also displays the acquired image on the display panel 141. Specifically, the display control unit 352 opens a sub-image window 451 near the image window 450 and displays a title such as "Current" indicating that the displayed image shows a state obtained during the movement together with the unfolded image. Further, the display control unit 352 opens a state indication window 452 indicating that the mobile robot 100 is moving and displays its situation such as a message "Mobile robot is moving" or the like on the opened state indication window 452. By the above-described display, the user can recognize the intermediate state before the latest imaging data is obtained and also recognize that the latest imaging data has not been sent yet.

In FIG. 8, a lower part shows a response screen of the remote terminal 300 when the mobile robot 100 has reached a position from which it can shoot the designated spatial area and has transmitted imaging data generated by shooting the spatial area. When the determination unit 351 determines that the acquired imaging data is current imaging data obtained by shooting the designated spatial area, the display control unit 352 erases the sub-image window 451 and the state indication window 452. Then, the display control unit 352 unfolds the current imaging data and replaces the image in the image window 450 with the unfolded imaging data. Further, the display control unit 352 also replaces the title with one indicating that the imaging data shows the current state, such as a title "Real time photo". The user can recognize, for example, a transparent container with a fork contained therein and a book, which were not present in the shelf in the past image (the image window 450 in the upper part of FIG. 8), in the current image (the image window 450 in the lower part of FIG. 8). By replacing the displayed image with the latest image as described above, the user can obtain accurate information about the designated spatial area.

Figure 9:
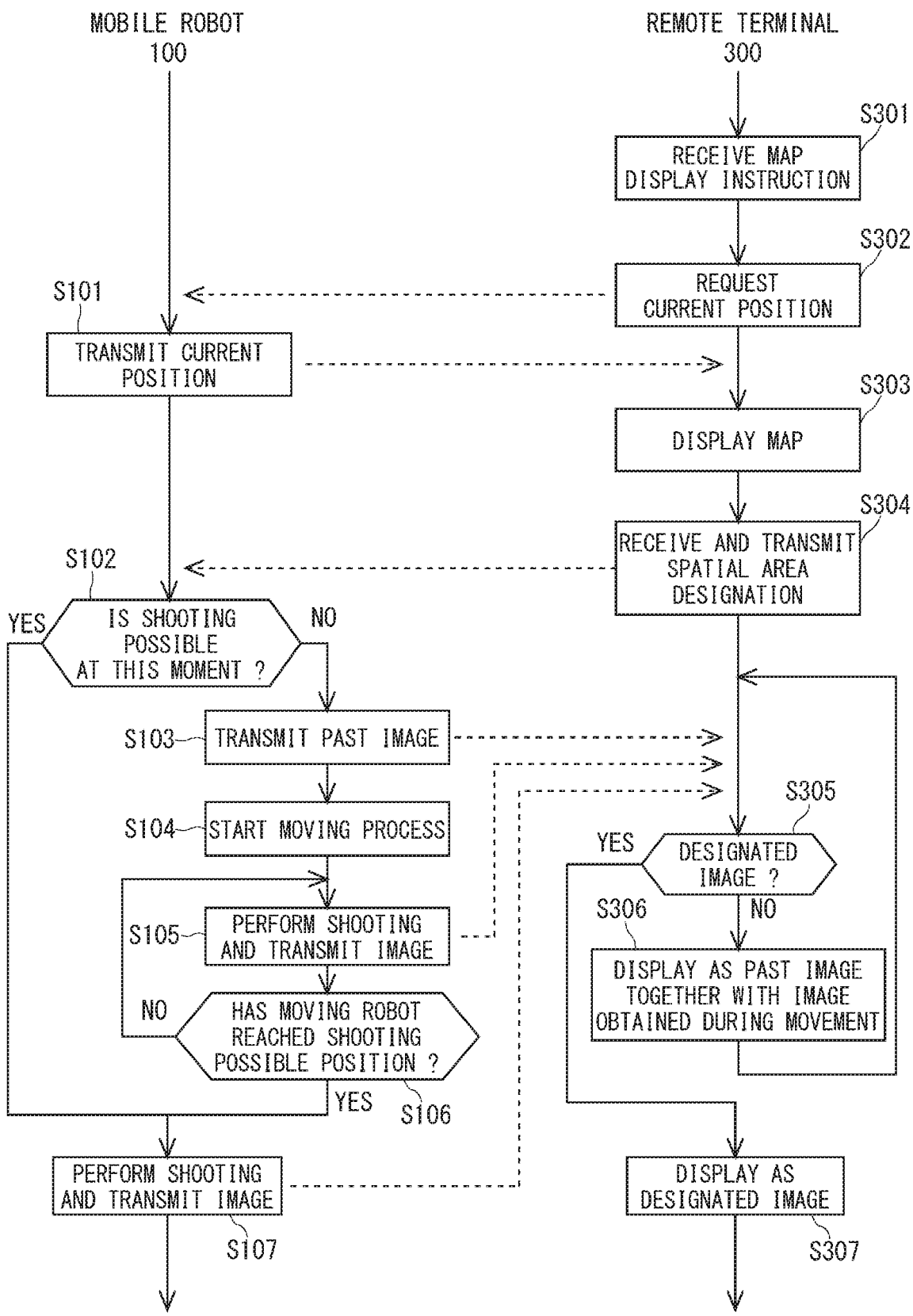
FIG. 9 is a flowchart for explaining processes performed by a mobile robot and a remote terminal.

Next, processes related to a task in which a user requests imaging data, performed by the mobile robot 100 and the remote terminal 300 are described. FIG. 9 is a flowchart for explaining processes performed by the mobile robot 100 and the remote terminal 300. A flow on a left side represents a flow of processes performed by the mobile robot 100 and a flow on a right side represents a flow of processes performed by the remote terminal 300. Further, exchanges of signals and imaging data performed through the system server 500 are indicated by dotted-line arrows pointing from transmission sources to transmission destinations.

When the calculation unit 350 of the remote terminal 300 receives an instruction to display a map from a user through the input unit 342, which is, for example, a touch panel, in a step S301, the process proceeds to a step S302 and the calculation unit 350 requests information on the current position of the mobile robot 100 from the mobile robot 100. Specifically, the calculation unit 350 generates a request signal requesting information on the current position and transmits the generated request signal to the mobile robot 100 through the communication unit 190.

When the control unit 150 of the mobile robot 100 receives the request signal from the remote terminal 300, it checks its own current position and transmits information on the current position to the remote terminal 300 in a step S101. Note that the current position is checked by, for example, extracting structures present in the space from image information acquired from the stereo camera 131 and performing matching between relative positional relations with the mobile robot itself and the structures described in the map information.

Upon receiving the information on the current position of the mobile robot 100, the display control unit 352 of the remote terminal 300 displays a map of the space in which the mobile robot 100 is included on the display panel 341 in the format shown in FIG. 5 or the like in a step S303. Then, the process proceeds to a step S304 and the calculation unit 350 receives designation of a spatial area from the user through the input unit 342 as described above with reference to FIG. 5 and the like. Upon receiving the designation of the spatial area, the calculation unit 350 generates a designation signal and transmits the generated designation signal to the mobile robot 100.

Upon receiving the designation signal from the remote terminal 300, the control unit 150 of the mobile robot 100 proceeds to the step S102 and it determines whether or not it is possible to immediately shoot the spatial area designated by the designation signal by the stereo camera 131. Note that when it is possible to shoot the designated spatial area just by swinging the head part 122 with the stereo camera 131 mounted thereon, the control unit 150 may determine that it is possible to immediately shoot the designated spatial area. When the control unit 150 determines that the shooting is possible, the process proceeds to a step S107, in which the control unit 150 shoots the designated spatial area and transmits generated imaging data to the remote terminal 300. When the control unit 150 determines that the shooting is impossible, the process proceeds to a step S103.

In the step S103, the control unit 150 acquires imaging data including an image of the designated spatial area from the past image DB 182 and transmits the acquired imaging data to the remote terminal 300. Then, the process proceeds to a step S104 and the control unit 150 starts a moving process in order to shoot the designated spatial area by the stereo camera 131. Specifically, the control unit 150 defines a place from which it can shoot the designated spatial area as a destination and plans a route from the current position to the destination by using the map information. When the planning is completed, the mobile robot 100 starts to move.

Upon starting the movement, the process proceeds to a step S105, in which the control unit 150 performs shooting at constant intervals and transmits obtained imaging data to the remote terminal 300. In the imaging data, additional information indicating that the imaging data was generated by performing shooting during the movement is added in its header information or the like. Then, in a step S106, the control unit 150 checks whether or not the mobile robot 100 has reached the position from which the shooting is possible (hereinafter referred to as the shooting possible position), i.e., has reached the destination. When the mobile robot has not reached the shooting possible position yet, the process returns to the step S105. When the mobile robot has reached the shooting possible position, the process proceeds to a step S107, in which the control unit 150 shoots the designated spatial area and transmits generated imaging data to the remote terminal 300.

After transmitting the designation signal in the step S304, the calculation unit 350 of the remote terminal 300 receives the imaging data sent from the mobile robot 100. Upon receiving the imaging data, the determination unit 351 determines whether or not the received imaging data is one that was obtained by having the mobile robot 100 shoot the designated spatial area after the remote terminal 300 transmitted the designation signal in a step S305.

The determination unit 351 checks, for example, the header information of the imaging data and determines whether not the imaging data corresponds to the above-described imaging data. Specifically, when the header information of the received imaging data includes additional information indicating that the imaging data is one accumulated in the past image DB 182, the determination unit 351 determines that the received imaging data is imaging data in the past. Further, when the header information includes additional information indicating that the received imaging data is one that was generated by the mobile robot 100 by performing shooting during the movement, the determination unit 351 determines that the received imaging data is the current imaging data but is not one that was obtained by shooting the designated spatial area. When the determination unit 351 confirms such additional information, the process proceeds to a step S306.

In the step S306, the display control unit 352 displays the past image and the image obtained during the movement in the format shown in the upper part of FIG. 8. When no image was received during the movement, the sub-image window 451 is not opened. While the past image is being displayed, the process returns to the state immediately before the step S305 so that the remote terminal 300 can receive new imaging data from the mobile robot 100.

When the determination unit 351 determines that the received imaging data is one that was obtained according to the designation signal by checking, for example, the header information of the imaging data in the step S305, the process proceeds to a step S307. In the step S307, the display control unit 352 displays an image of the received imaging data on the display panel 141 in the format shown in the lower part of FIG. 6 or 8.

When the user wants to check a certain spatial area, the above-described processes are repeated. Note that when the user designates a new and different spatial area after the moving process is started in the step S104 and before the mobile robot 100 reaches the shooting possible position, the control unit 150 may abandon the shooting of the previously-designated spatial area and perform a series of processes for the newly-designated spatial area. Further, when the mobile robot 100 cannot plan a route to reach the designated spatial area in the step S104, it may notify the remote terminal 300 that the designated spatial area cannot be shot. In this case, the remote terminal 300 displays information indicating that the current image of the designated spatial area cannot be displayed on the display panel 341.

Figure 10:
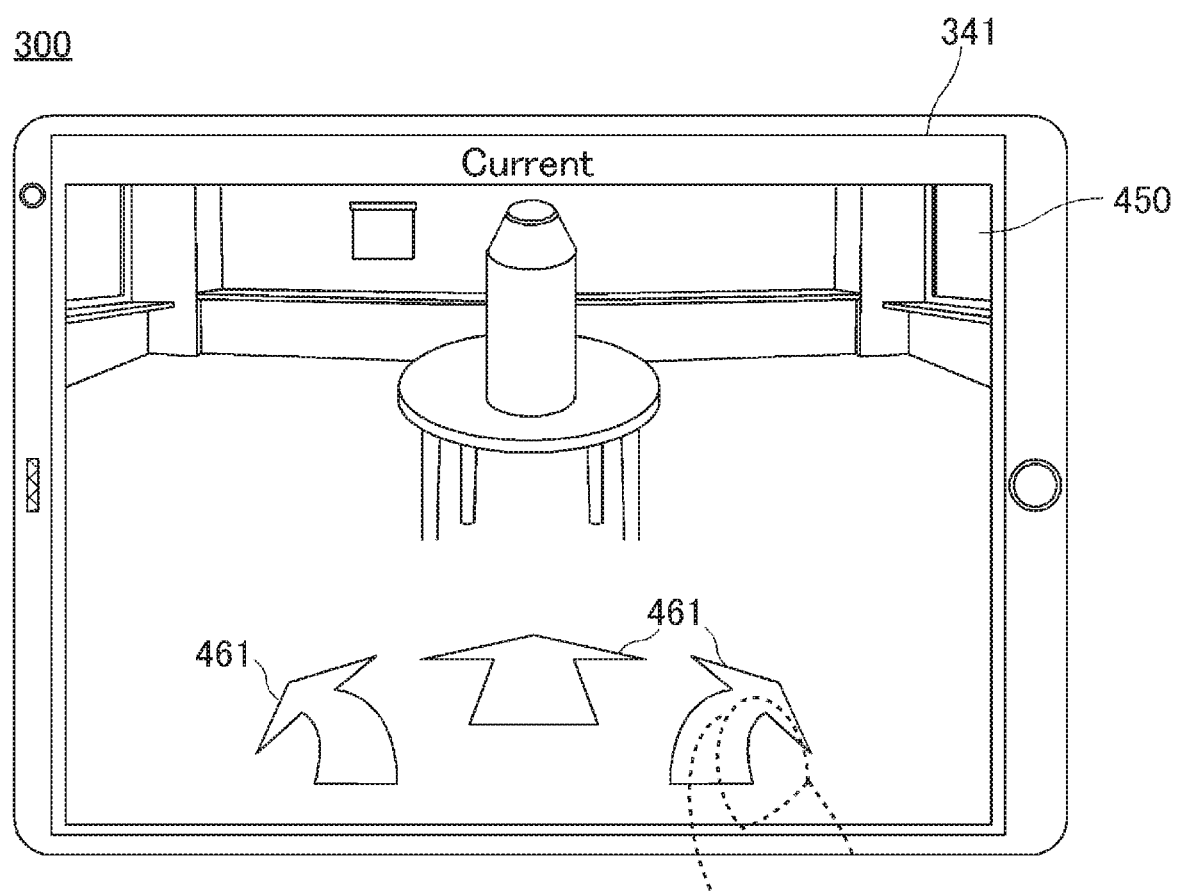
FIG. 10 shows how a spatial area that a user wants to check is designated by using a different method.

In the above-described embodiment, the calculation unit 350 of the remote terminal 300 opens the map window 410. Then, by having the user touch a certain place on the map 411 displayed on the map window 410, the calculation unit 350 receives the designation of the spatial area. However, the designation of a spatial area is not limited to this example method. FIG. 10 shows how a spatial area that a user wants to check is designated by using a different method.

The display control unit 352 opens the image window 450 and displays an image currently captured by the stereo camera 131 of the mobile robot 100 as an initial display screen (i.e., an initial display image) in the opened image window 450 before receiving any designation from the user. That is, the control unit 150 of the mobile robot 100 performs shooting by the stereo camera 131 and transmits obtained imaging data to the remote terminal 300 before receiving any designation signal. Then, when the calculation unit 350 of the remote terminal 300 receives the imaging data, the display control unit 352 converts this imaging data into an image signal and displays an image thereof on the image window 450. By repeating the above-described series of processes, the image window 450 is updated as a window showing a live image. In this example, the image window 450 has a size roughly equal to the entire surface area of the display panel 341 in order to give the user a sense of immersion.

The display control unit 352 displays direction indication buttons 461 in a lower area of the image window 450. The direction indication buttons 461 are, for example, composed of three arrow buttons indicating a straight movement, a right turn, and a left turn, respectively, as shown in FIG. 10. By using an image displayed as the initial display screen as a reference, the user can designate a spatial movement in any one of the above-described three directions by touching the respective one of the direction indication buttons 461 in a successive manner. When the mobile robot 100 can move in the direction indicated by the touching in time, it performs shooting and transmits obtained imaging data to the remote terminal 300.

On the other hand, for example, when the direction indication button 461 is repeatedly touched at short intervals, the mobile robot 100 acquires imaging data of a spatial area corresponding to a direction indicated by the touched arrow button (i.e., the touched direction indication button) from the past image DB 182 and transmits the acquired imaging data to the remote terminal 300. When the sent image is the current image, the display control unit 352 of the remote terminal 300 displays, for example, a title such as "Current", whereas when the sent image is an image in the past, the display control unit 352 displays, for example, a title such as "Past photo". By immediately changing the displayed image to an image in the past when the mobile robot cannot move in the designated direction in time as described above, it is possible to prevent current images that are sent every time the display panel is tapped and hence are not smooth from being displayed. Therefor, it is possible to eliminate an apprehension that the user may have a motion sickness due to the unsmooth video image.

Once the display control unit 352 displayed the past image, every time it receives tapping after that, it acquires a past image corresponding to a direction indicated by the tapping and displays the acquired past image on the image window 450, so that the user feels as if he/she is observing the space from the viewpoint of the mobile robot 100, which is moving around. When the display control unit 352 determines that the user has not tapped on the display panel for a certain period of time, it determines that the user has designated the spatial area that is displayed at that moment and fixes the designation of the spatial area. When the image displayed on the image window 450 is a past image at the point when the designation is fixed, the display control unit 352 generates a designation signal indicating the designated spatial area and transmits the generated designation signal to the mobile robot 100.

Figure 11:
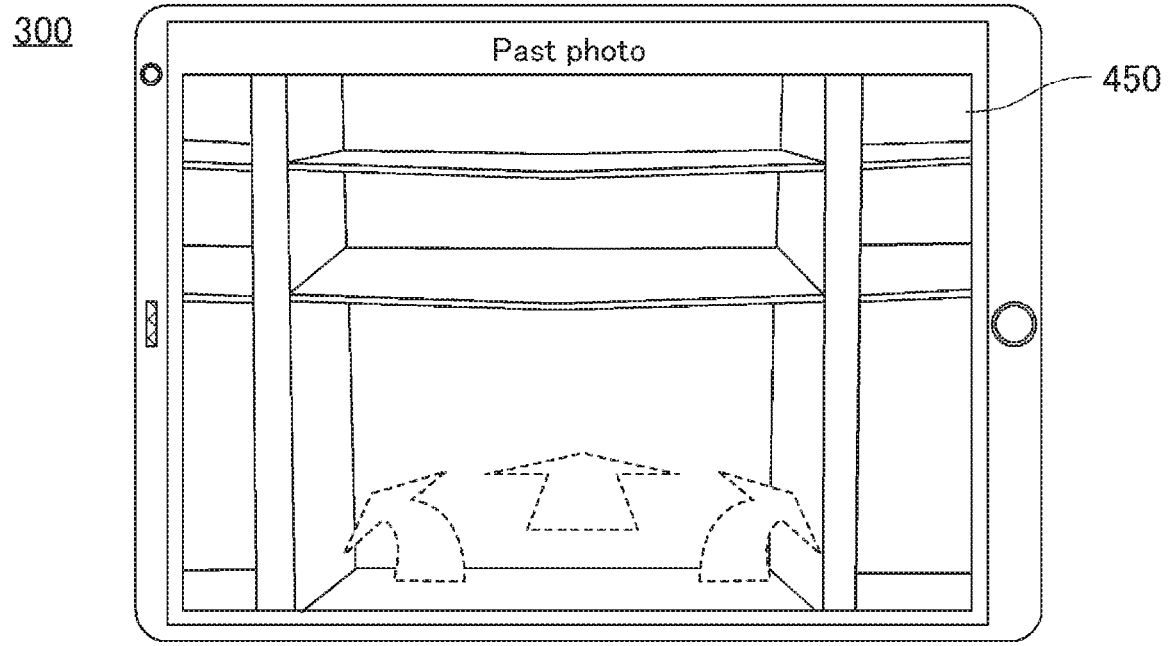
FIG. 11 shows how designation of a spatial area is fixed.
Figure 12:
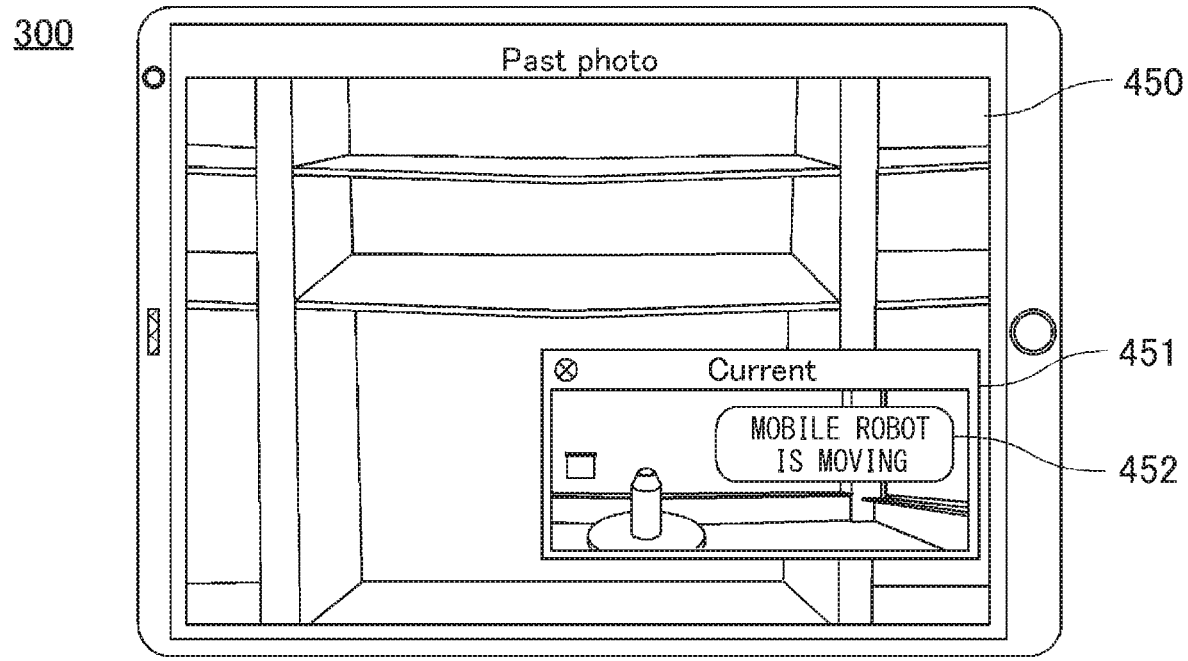
FIG. 12 shows a state after a spatial area that a user wants to check is fixed.

FIG. 11 shows how designation of a spatial area is fixed. The display control unit 352 erases the direction indication buttons 461, so that the user recognizes that the designation of the spatial area is fixed. FIG. 12 shows a state after the spatial area that the user wants to check is fixed. The image window 450 is fixed in a state where the designated past image is displayed thereon. Then, a sub-image window 451 is opened and an image captured by the stereo camera 131 of the mobile robot 100 at that moment is displayed on the opened sub-image window 451. Further, a state indication window 452 indicating that the mobile robot 100 is moving is opened. Note that only the state indication window 452 may be displayed without displaying the sub-image window 451.

Figure 13:
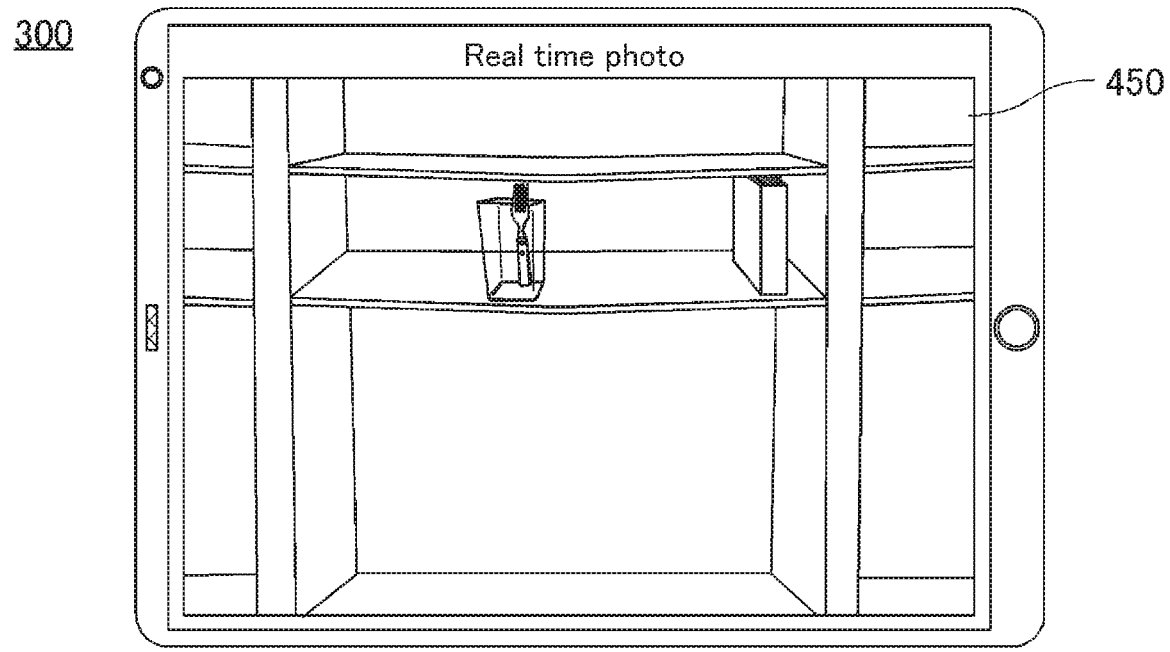
FIG. 13 shows a current state of a spatial area that a user wants to check.

FIG. 13 shows the current state of the spatial area that the user wants to check. When the mobile robot 100 shoots the designated spatial area and transmits obtained imaging data, the display control unit 352 erases the sub-image window 451 and the state indication window 452 as shown in FIG. 13. Then, the received imaging data is unfolded and the image on the image window 450 is replaced by an image of the unfolded imaging data. Further, the title is also replaced by "Real time photo" or the like indicating that the image shows the current state.

Note that when there is no past image data of the space corresponding to the tapping in the past image DB 182, an artificial image may be generated by performing an interpolating process on past image data of nearby spaces and the generated artificial image may be displayed. Alternatively, a replacement image prepared in advance may be displayed. In any case, by displaying, as a real image, imaging data that is taken when the viewpoint moving operation of the mobile robot 100 has been completed and hence the mobile robot has come into a standstill, the user can visually recognize a satisfactory image in a comfortable manner.

Although the above-described embodiment has been described on the assumption still-image data is used as imaging data to be transmitted/received, the imaging data to be transmitted/received may be moving-image data. Further, when there is no imaging data including an image of the designated spatial area in the past image DB 182, information indicating that there is no past image may be displayed on the display panel 341 of the remote terminal 300.

Further, the designation of a spatial area may include designation of an observation direction. For example, it is possible to designate a direction that a user wants to observe by displaying a pointer 421 and having the user perform a swiping action toward the pointer 421. In this case, the designation signal includes information on a direction that the user wants to observe and is designated by the user. Further, the mobile robot 100 positions the stereo camera 131 according to this direction and preforms shooting by the stereo camera 131.

Further, the remote terminal 300 is not limited to the tablet-type terminal. The remote terminal 300 may be a smartphone or a terminal equipped with a head-mount display. Further, the remote terminal 300 is not limited to those wirelessly connected. For example, the remote terminal 300 may be a PC (Personal Computer) terminal connected through a wired LAN.

Further, the image pickup unit of the mobile robot 100 is not limited to the stereo camera 131. For example, a single-lens camera unit may be used as the image pickup unit. In particular, when the image pickup unit is provided separately from the camera unit(s) used for three-dimensional measurements of spaces, various types of camera units can be used as the image pickup unit.

According to the mobile robot 100 and the remote terminal 300 in accordance with the above-described embodiment, a user, who remotely operates the mobile robot 100, can visually recognize an image of a designated spatial area immediately, though the visually-recognized image could be an image in the past. Therefore, the user can recognize a state of the spatial area without delay. Further, when the mobile robot 100 cannot shoot the designated spatial area at that moment, it immediately starts a moving process in order to shoot that spatial area. Therefore, it is possible to reduce a wasteful time that is taken before shooting the actual state. Further, the checking work of the designated spatial area according to this embodiment is also useful when, for example, a task of conveying a container is performed after a state of its destination is checked in advance. For example, the user interface shown in FIG. 13 may be configured so that when a user touches the screen after checking a target space, a pop-up window that enables the user to instruct the mobile robot to grasp and move a touched object is displayed.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer through a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A mobile robot comprising an image pickup unit, further comprising:
   an accumulation unit configured to accumulate imaging data taken in the past;
   a reception unit configured to receive designation of a spatial area from a remote terminal; and
   a processing unit configured to:
      determine whether the spatial area is within a current view of the image pickup unit;
      in response to determining that the spatial area is within the current view of the image pickup unit, perform shooting and transmit obtained imaging data to the remote terminal; and
      in response to determining that the spatial area is outside the current view of the image pickup unit, transmit first imaging data including an image of the spatial area previously accumulated in the accumulation unit to the remote terminal, determine a destination where the spatial area is within a view of the image pickup unit, control the mobile robot to move toward the destination, capture second imaging data for the spatial area by the image pickup unit, and transmit, to the remote terminal, the second imaging data to replace the first imaging data, wherein
      the first imaging data includes header information indicating that the first imaging data is previously accumulated in the accumulation unit; and
      the second imaging data includes header information indicating that the second imaging data was captured by the mobile robot in response to receiving the designation of the spatial area from the remote terminal.

2. The mobile robot according to claim 1, wherein when imaging data is obtained by shooting the spatial area by the image pickup unit after the moving process is started, the processing unit transmits the imaging data to the remote terminal.

3. The mobile robot according to claim 1, wherein when the processing unit transmits imaging data accumulated in the accumulation unit, the processing unit transmits the imaging data to the remote terminal together with additional information indicating that the imaging data is one accumulated in the accumulation unit.

4. The mobile robot according to claim 1, wherein the processing unit performs shooting by using the image pickup unit and transmits obtained imaging data to the remote terminal before the reception unit receives the designation of the spatial area.

5. A non-transitory computer readable medium storing a control program for a mobile robot including an image pickup unit, for causing a computer to execute:
   a receiving step of receiving designation of a spatial area from a remote terminal;
   a determining step of, when the designation is received in the receiving step, determining whether the spatial area is within a current view of the image pickup unit;

a first transmitting step of, in response to determining that the spatial area is within the current view of the image pickup unit, shooting the spatial area and transmitting obtained imaging data to the remote terminal;

a second transmitting step of, in response to determining that the spatial area is outside the current view of the image pickup unit, acquiring first imaging data including an image of the spatial area from an accumulation unit in which imaging data taken in the past is accumulated and transmitting the first imaging data to the remote terminal; and a process starting step of, in response to determining that the spatial area is outside the current view of the image pickup unit, determining a destination where the spatial area is within a view of the image pickup unit, controlling the mobile robot to move toward the destination, capturing second imaging data for the spatial area by using the image pickup unit, and transmitting, to the remote terminal, the second imaging data to replace the first imaging data, wherein the first imaging data includes header information indicating that the first imaging data is previously accumulated in the accumulation unit; and the second imaging data includes header information indicating that the second imaging data was captured by the mobile robot in response to receiving the designation of the spatial area from the remote terminal.

6. A control system including a mobile robot comprising an image pickup unit, further comprising:

an accumulation unit configured to accumulate imaging data taken in the past;

a reception unit configured to receive designation of a spatial area from a remote terminal; and a processing unit configured to:

determine whether the spatial area is within a current view of the image pickup unit;

in response to determining that the spatial area is within the current view of the image pickup unit, perform shooting and transmit obtained imaging data to the remote terminal; and in response to determining that the spatial area is outside the current view of the image pickup unit, transmit first imaging data including an image of the spatial area previously accumulated in the accumulation unit to the remote terminal, determine a destination where the spatial area is within a view of the image pickup unit, control the mobile robot to move toward the destination, capture second imaging data for the spatial area by the image pickup unit, and transmit, to the remote terminal, the second imaging data to replace the first imaging data, wherein the first imaging data includes header information indicating that the first imaging data is previously accumulated in the accumulation unit; and the second imaging data includes header information indicating that the second imaging data was captured by the mobile robot in response to receiving the designation of the spatial area from the remote terminal.

7. A control method for a mobile robot including an image pickup unit, comprising:

a receiving step of receiving designation of a spatial area from a remote terminal;

a determining step of, when the designation is received in the receiving step, determining whether the spatial area is within a current view of the image pickup unit;

a first transmitting step of, in response to determining that the spatial area is within the current view of the image pickup unit, shooting the spatial area and transmitting obtained imaging data to the remote terminal;

a second transmitting step of, in response to determining that the spatial area is outside the current view of the image pickup unit, acquiring first imaging data including an image of the spatial area from an accumulation unit in which imaging data taken in the past is accumulated and transmitting the first imaging data to the remote terminal; and a process starting step of, in response to determining that the spatial area is outside the current view of the image pickup unit, determining a destination where the spatial area is within a view of the image pickup unit, controlling the mobile robot to move toward the destination, capturing second imaging data for the spatial area by using the image pickup unit, and transmitting, to the remote terminal, the second imaging data to replace the first imaging data, wherein the first imaging data includes header information indicating that the first imaging data is previously accumulated in the accumulation unit; and the second imaging data includes header information indicating that the second imaging data was captured by the mobile robot in response to receiving the designation of the spatial area from the remote terminal.

* * * * *